(12) United States Patent
Ogawa et al.

(10) Patent No.: US 7,871,093 B2
(45) Date of Patent: Jan. 18, 2011

(54) TORSION BEAM SUSPENSION

(75) Inventors: Tetsu Ogawa, Saitama (JP); Shunsuke Kataoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 11/633,893

(22) Filed: Dec. 5, 2006

(65) Prior Publication Data

US 2007/0126200 A1 Jun. 7, 2007

(30) Foreign Application Priority Data

Dec. 5, 2005 (JP) ............................. 2005-350297

(51) Int. Cl.
*B60G 21/05* (2006.01)
(52) U.S. Cl. .................. 280/124.166; 280/124.11; 280/124.116; 280/124.125; 280/124.128; 280/684
(58) Field of Classification Search ............ 280/124.11, 280/124.116, 124.125, 684, 124.128, 124.149, 280/124.166, 124.167
See application file for complete search history.

(56) References Cited

U.S. PATENT DOCUMENTS

| | | | | |
|---|---|---|---|---|
| 3,575,441 A | * | 4/1971 | Arning et al. | 280/124.107 |
| 3,767,224 A | * | 10/1973 | Schneeweiss | 280/124.128 |
| 4,232,881 A | * | 11/1980 | Kolbel et al. | 280/124.128 |
| 4,432,564 A | * | 2/1984 | Tronville | 280/124.106 |
| 4,486,030 A | * | 12/1984 | Takata et al. | 280/124.107 |
| 4,623,164 A | * | 11/1986 | Cassel et al. | 280/124.106 |
| 4,750,757 A | * | 6/1988 | Long | 280/124.106 |
| 4,787,680 A | * | 11/1988 | Bonjean et al. | 301/124.1 |
| 4,790,974 A | * | 12/1988 | Perkins et al. | 264/328.1 |
| 4,951,962 A | * | 8/1990 | Tomida et al. | 280/124.108 |
| 5,277,450 A | * | 1/1994 | Henschen | 280/6.151 |
| 5,335,932 A | * | 8/1994 | Pierce | 280/788 |
| 5,409,254 A | * | 4/1995 | Minor et al. | 280/124.166 |
| 5,507,518 A | * | 4/1996 | Nakahara et al. | 280/124.166 |
| 5,518,265 A | * | 5/1996 | Buthala et al. | 280/124.166 |
| 5,520,407 A | * | 5/1996 | Alatalo et al. | 280/124.166 |
| 5,639,110 A | * | 6/1997 | Pierce et al. | 280/124.116 |
| 5,800,024 A | * | 9/1998 | Steimmel et al. | 301/127 |

(Continued)

FOREIGN PATENT DOCUMENTS

JP 01-278814 11/1989

(Continued)

*Primary Examiner*—Paul N. Dickson
*Assistant Examiner*—Barry Gooden, Jr.
(74) *Attorney, Agent, or Firm*—Carrier Blackman & Associates, P.C.; William D. Blackman; Joseph P. Carrier (57) ABSTRACT

A torsion beam suspension includes a pair of lateral trailing members, each of which has a front end portion pivotally supported by a vehicle body and also has a rear end portion adapted to suspend wheels. The suspension also includes a torsion beam adapted to have an open face, in which a vehicle front side or a vehicle rear side thereof is opened, and arranged to extend in a lateral direction of a vehicle. Intermediate portions of the pair of trailing members are respectively bonded to corresponding end portions of the torsion beam. On an inner side wall of each of the trailing members, a patch member connecting a corresponding one of the trailing members to the torsion beam is disposed.

10 Claims, 7 Drawing Sheets

U.S. PATENT DOCUMENTS

| | | | |
|---|---|---|---|
| 5,813,691 A * | 9/1998 | Aoki et al. | 280/124.106 |
| 5,909,888 A * | 6/1999 | Betz et al. | 280/124.166 |
| 5,954,350 A * | 9/1999 | Santo et al. | 280/124.107 |
| 6,022,034 A * | 2/2000 | Santo et al. | 280/124.106 |
| 6,047,978 A * | 4/2000 | Watanabe et al. | 280/124.106 |
| 6,086,162 A * | 7/2000 | Pinch et al. | 301/124.1 |
| 6,099,084 A * | 8/2000 | Bungarten et al. | 301/127 |
| 6,173,977 B1 * | 1/2001 | Fun | 280/124.116 |
| 6,460,869 B1 * | 10/2002 | Tremouilles | 280/124.116 |
| 6,616,157 B2 * | 9/2003 | Christophliemke et al. | 280/124.106 |
| 6,702,308 B2 * | 3/2004 | Yamaguchi | 280/124.166 |
| 6,805,369 B2 * | 10/2004 | Galazin | 280/124.116 |
| 6,889,989 B2 * | 5/2005 | Park | 280/124.166 |
| 6,935,646 B2 * | 8/2005 | Inoue et al. | 280/124.106 |
| 6,966,612 B2 * | 11/2005 | Philpott | 301/128 |
| 7,044,565 B2 * | 5/2006 | Kang | 301/127 |
| 7,284,765 B1 * | 10/2007 | Inoue et al. | 280/124.166 |
| 7,427,113 B2 * | 9/2008 | Choi | 301/124.1 |
| 2002/0105159 A1 * | 8/2002 | Christophliemke et al. | 280/124.166 |
| 2004/0007846 A1 * | 1/2004 | Inoue et al. | 280/124.166 |
| 2004/0032106 A1 * | 2/2004 | Park | 280/124.107 |
| 2004/0080132 A1 * | 4/2004 | Chan et al. | 280/124.11 |
| 2006/0027993 A1 * | 2/2006 | Takayanagi et al. | 280/124.166 |
| 2006/0131829 A1 * | 6/2006 | Alesso et al. | 280/124.166 |
| 2007/0052194 A1 * | 3/2007 | Marchel | 280/124.166 |
| 2007/0108714 A1 * | 5/2007 | Kim et al. | 280/124.116 |

FOREIGN PATENT DOCUMENTS

| | | |
|---|---|---|
| JP | 10-230723 | 9/1998 |
| JP | 10-236123 | 9/1998 |
| JP | 2001-080329 | 3/2001 |

* cited by examiner

TORSION BEAM SUSPENSION

BACKGROUND OF THE INVENTION

1. Field of the Invention

The present invention relates to a torsion beam suspension configured so that both end portions of a torsion beam extending in a lateral direction of a vehicle are respectively bonded to a pair of lateral trailing members, each of which has a front end portion pivotally supported by a vehicle body and also has a rear end portion adapted to suspend wheels.

2. Description of Related Art

Hitherto, a related torsion beam suspension of an automobile has been configured so that both end portions of a torsion beam are welded to intermediate portions of the inner side walls of left and right trailing members (or arms), respectively (see, for example, Japanese Patent Unexamined Publications JP-A-10-230723 and JP-A-10-236123).

In such a torsion beam, due to unevenness of the surface of a road, on which the automobile runs, or to a lateral force caused during the turning of the automobile, trailing members supporting left and right rear wheels vertically swing with different amplitudes, respectively. Then, the torsion beam torsionally deforms due to the difference in vertical swinging angle between the left and right trailing members, so that a large stress is applied to a place at which each of both lateral ends of the torsion beam is welded to a corresponding one of the trailing members.

Thus, the strength of each welded portion is increased by increasing the anteroposterior width between both the lateral end portions of the torsion beam to increase the length of a part at which each of the lateral end portions of the torsion beam is welded to the corresponding one of the trailing members.

Figure 7:
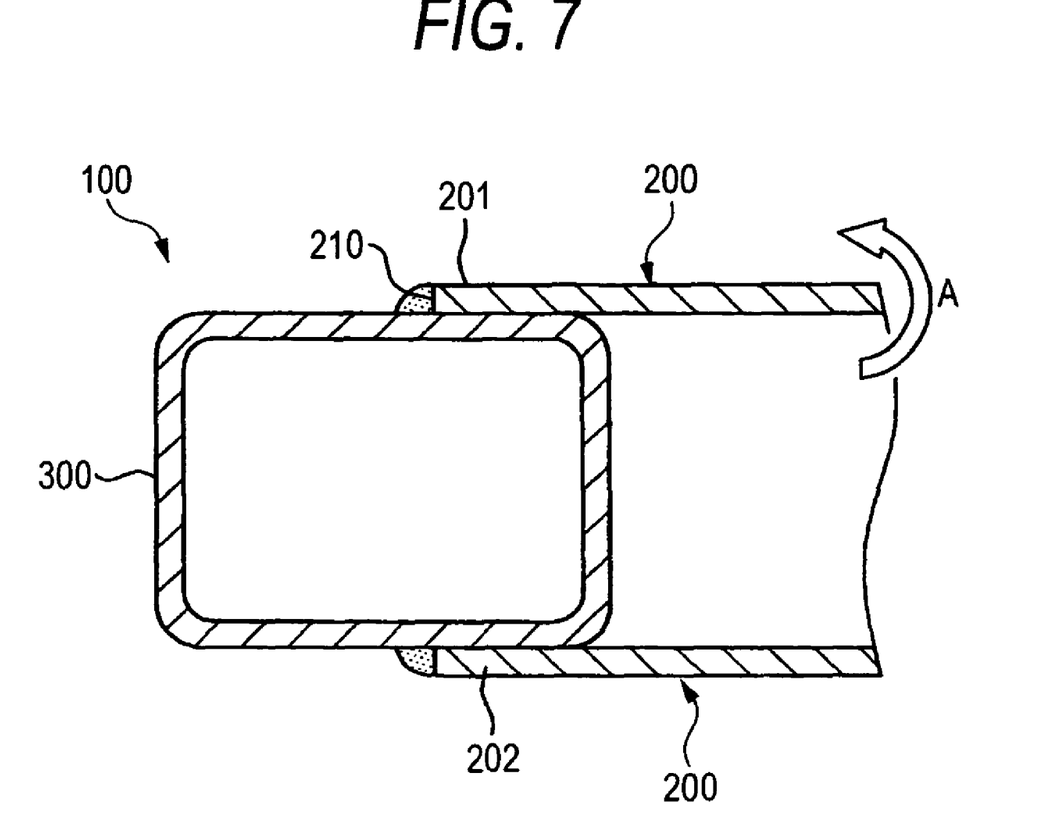
FIG. 7 is a partly cross-sectional view showing a welded portion of a torsion beam suspension of the related art.

FIG. 7 is a partial cross-sectional view showing a welded portion of a related torsion beam suspension.

As shown in FIG. 7, the related torsion beam suspension 100 is configured v so that the top end portion 201 and the bottom end portion 202 of each of both the left and right ends of a cross-sectionally substantially-U-shaped torsion beam 200 opened to the front side of a vehicle are welded to the top surface and the bottom surface of a trailing member 300, respectively.

For example, when the trailing member 300 moves up and down, the torsion beam 200 is loaded with an upward bending moment A. An upper welded portion 210 has a very high stress concentration factor. Thus, a maximum stress is applied to this portion. Consequently, this portion may be peeled from the trailing member 300. Alternatively, a crack may occur in an end part of the welded portion 210.

Reinforcement measures against a stress applied to the connection portion between the torsion beam 200 and the trailing member 300 are, for example, a gusset provided at the connection portion, a notch formed in the connection part of the torsion beam, and a depression formed in the vicinity of the connection portion of the trailing member, as disclosed in the JP-A-10-230723 and JP-A-10-236123.

However, although the torsion beam suspensions as disclosed in the JP-A-10-230723 and JP-A-10-236123 are reinforced by the gusset or the depression against a horizontal bending moment, such countermeasures have no effect on the upward bending moment A caused when the trailing member 300 moves up and down, as shown in FIG. 7.

Thus, the related torsion beam suspensions have a problem in that the maximum stress due to the upward bending moment A is applied to the welded portion 210 to facilitate the peeling of the torsion beam 200 from the trailing member 300.

Generally, a method of changing the trimmed shape of each of both the left and right end portions of the torsion beam 200, a method of welding a reinforcement member over the welded portion 210, and a method of reducing the thickness of the torsion beam 200 are considered as means for solving this problem.

However, as shown in FIG. 7, the area of the top surface of the trailing member 300 is small. Thus, each surface, on which the torsion beam 200 is bonded to the trailing member 300, is restricted. Consequently, the method of changing the trimmed shape of each of both the left and right end portions of the torsion beam 200 is ineffective in solving the problem due to the bending moment A.

Also, the method of welding the reinforcement member over the welded portion 210 cannot have a large effect in dispersing a stress due to the bending moment A. This method has a problem in that the weight of the torsion beam suspension is increased due to the reinforcement member.

The method of reducing the thickness of the torsion beam 200 has a problem in that the stiffness of the torsion beam suspension 100 is decreased with reduction in the thickness thereof.

Thus, it is desired that the durability of the welded portion (joint portion) 210 of the torsion beam 200 against the bending moment A is enhanced without increasing the sizes of both the left and right end portions of the torsion beam 200 and without increasing the material cost and the welding cost of the torsion beam suspension 100.

SUMMARY OF THE INVENTION

Accordingly, the invention is accomplished to solve the above problems. An object of the invention is to provide a torsion beam suspension enabled to reduce a stress applied to the joint portion between a trailing member and each of both end portions of a torsion beam.

To solve the problems, according to a first aspect of the invention, there is provided a torsion beam suspension comprising:

a lateral trailing member comprises:
  a front end portion pivotally supported by a vehicle body; and
  a rear end portion suspending a wheel;

a torsion beam that extends in a lateral direction of a vehicle, and comprises:
  an open face opposing to a vehicle front side or a vehicle rear side;
  an end portion connected to an intermediate portion of the trailing member;
  a patch member that is provided on an inner side wall of the trailing member, and connects the trailing member to the torsion beam.

According to the first aspect of the invention, the intermediate portion of the trailing member is bonded to the end portion of the torsion beam. On the inner side wall of the trailing member, a patch member connecting the trailing members to the torsion beam is disposed.

For example, when the trailing member moves up and down due to the unevenness of the surface of a road during running, the torsion beam is loaded with a bending moment with respect to the trailing member. Thus, stress acting in a peeling direction is applied to the joint portion between the torsion beam and the trailing member.

The patch member disposed on the inner inside wall of the trailing member is connected to the torsion beam. Thus, at a part to which the maximum stress due to the bending moment is applied, the torsion beam is connected to the patch member. Consequently, the part, to which the maximum stress due to the bending moment is applied, is placed to the center of the torsion beam (the center of swing). Accordingly, a stress applied to a joint portion between the trailing member and each of both left and right end portions of the torsion beam is reduced.

According to a second aspect of the invention, as set forth in the first aspect of the invention, it is preferable that
the torsion beam is cross-sectionally substantially U-shaped opened to the vehicle front side, and
the patch member connects an upper inside wall of the U-shaped torsion beam to an inner side wall of the trailing member.

According to the second aspect of the invention, the torsion beam is opened to the vehicle front side and is cross-sectionally substantially U-shaped. Each of the patch member connects the upper inside wall portion of the cross-sectionally substantially U-shaped torsion beam to the inner side wall of the trailing members. Consequently, when a bending moment is applied to the torsion beam, the maximum stress is applied to the part at which the patch member placed at a position toward the center of the torsion beam (the center of swing) from each of both the left and right end portions thereof is connected to the upper inside wall portion.

According to a third aspect of the invention, as set forth in the second aspect of the invention, it is preferable that
an upper edge portion of the patch member is welded to the upper inside wall portion; and
a lower edge portion of the patch member is welded to the inner side wall.

According to the third aspect of the invention, the upper edge portion of the patch members is welded to the upper inside wall portion. The lower edge portion of the patch member is welded to the inner side wall. Consequently, when a bending moment is applied to the torsion beam, the maximum stress is applied to a portion at which the patch member welded to a position toward the center of the torsion beam (the center of swing) from each of both the left and right end portions thereof is welded to the upper inside wall portion. Accordingly, a stress applied to the welded portion of each of both the left and right end portions of the torsion beam is reduced.

According to a fourth aspect of the invention, there is provided an assembling method for a torsion beam suspension comprising:
engaging a cutout portion of a torsion beam with an intermediate portion of a trailing member;
welding an end portion of the torsion beam to the intermediate portion of the trailing member; and
welding a patch member to an inner side wall of the trailing member.

According to a fifth aspect of the invention, it is preferable that the assembling method for the torsion beam suspension as set forth in the fourth aspect of the invention, further comprising:
welding a reinforce member to the inner side wall of the trailing member so as to cover a welded portion at which the trailing member is welded to the torsion beam, prior to welding the patch member to the trailing member.

According to a sixth aspect of the invention, as set forth in the fourth aspect of the invention, it is preferable that
an upper edge portion of the patch members is welded to an upper inside wall portion of torsion beam, and
a lower edge portion of the patch members is welded to an inner side wall of the trailing member.

According to a seventh aspect of the invention, as set forth in the fourth aspect of the invention, it is preferable that
the torsion beam extends in a lateral direction of a vehicle,
the torsion beam comprises an open face opposing to a vehicle front side or a vehicle rear side.

According to the first aspect of the invention, the patch member is provided at the joint portion between the torsion beam and each of the trailing members. Thus, a stress applied to the joint portion between the trailing member and each of both the left and right end portions of the torsion beam can be reduced. Consequently, the torsion beam can be prevented from being peeled from the trailing member due to the bending moment. Also, the durability and the strength of the torsion beam can be enhanced.

According to the second aspect of the invention, the portion, to which the maximum stress due to the bending moment applied to the torsion beam is applied, can be set to be the joint portion between the patch member, which is connected to each of the trailing members, and the torsion member and can be placed to the center of the torsion beam from each of both end portions thereof. Consequently, the torsion beam suspension according to the invention can prevent the torsion beam from being peeled from the trailing member. Also, the durability of the torsion beam suspension can be enhanced.

Also, each of the patch members can be formed in a relatively small size by connecting the upper inner wall portion of the torsion beam to the inner side wall of the corresponding trailing member. Thus, the material cost and the welding cost of the torsion beam suspension can be reduced.

According to the third aspect of the invention, the peeling of the welded portion of each of both the left and right end portions of the torsion beam from the trailing member can be prevented by the relatively small patch members. The durability of the torsion beam suspension against the bending moment, with which the torsion beam is frequently loaded, can be enhanced.

DETAILED DESCRIPTION OF EXEMPLARY EMBODIMENTS OF THE INVENTION EMBODIMENTS

First, a torsion beam suspension according to an embodiment of the invention is described below with reference to FIGS. 1 to 4. The torsion beam suspensions having a same configuration according to the embodiment are disposed in a left-side part and a right-side part of a vehicle body, respectively. Therefore, a right-side one of the torsion beam suspensions is described in the following description. The description of a left-side one of the torsion beam suspensions is omitted.

Incidentally, in the description of the embodiment of the invention, it is assumed that a "front" side is a forward direction side of a vehicle, that a "rear" side is a backward direction side thereof, that an "upper" side is a vertically upward direction thereof, that a "lower" side is a vertically downward direction thereof, and that a "lateral" side is a width direction side thereof.

Figure 1:
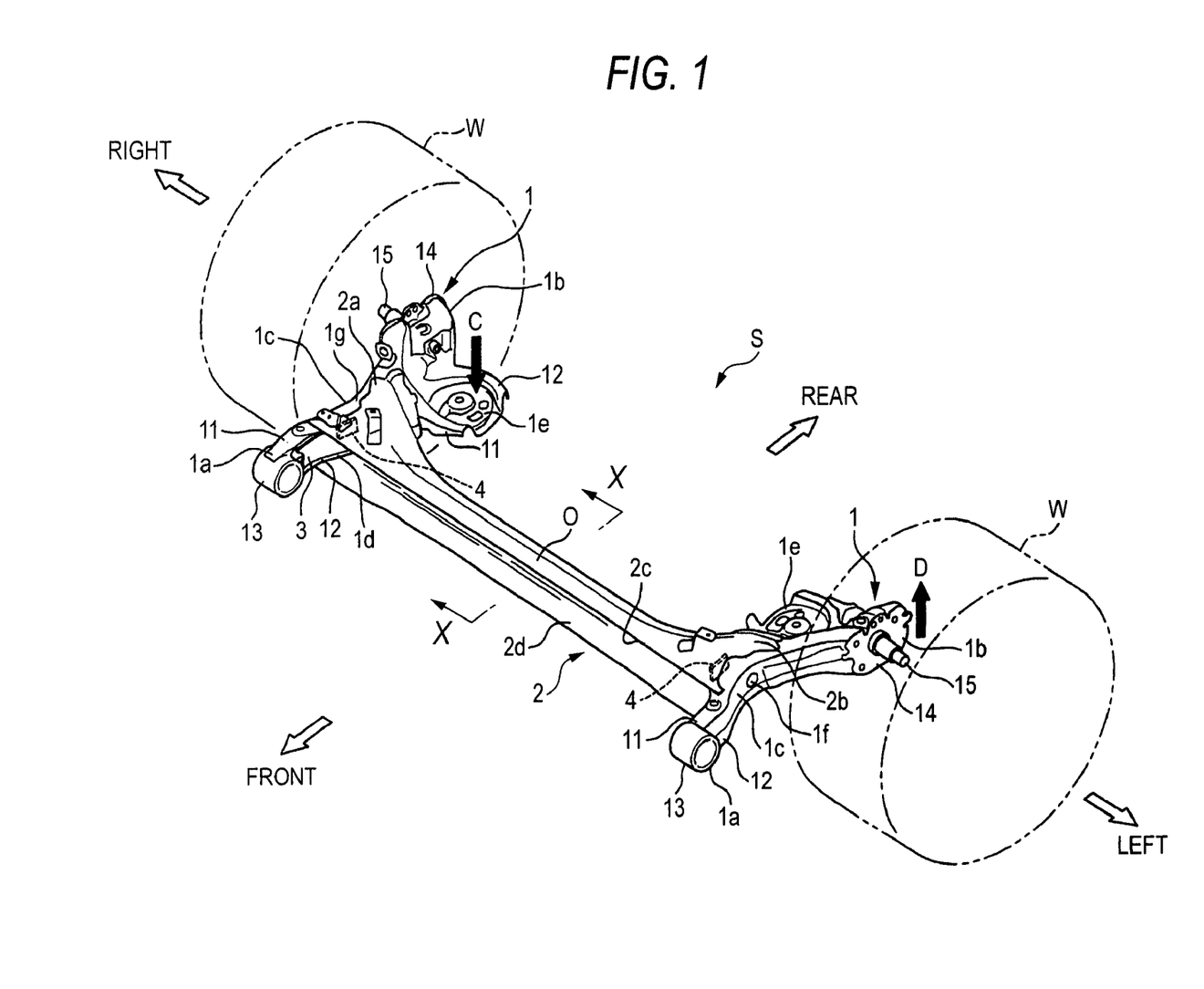
FIG. 1 is a perspective view showing a torsion beam suspension according to an embodiment of the invention.
Figure 2:
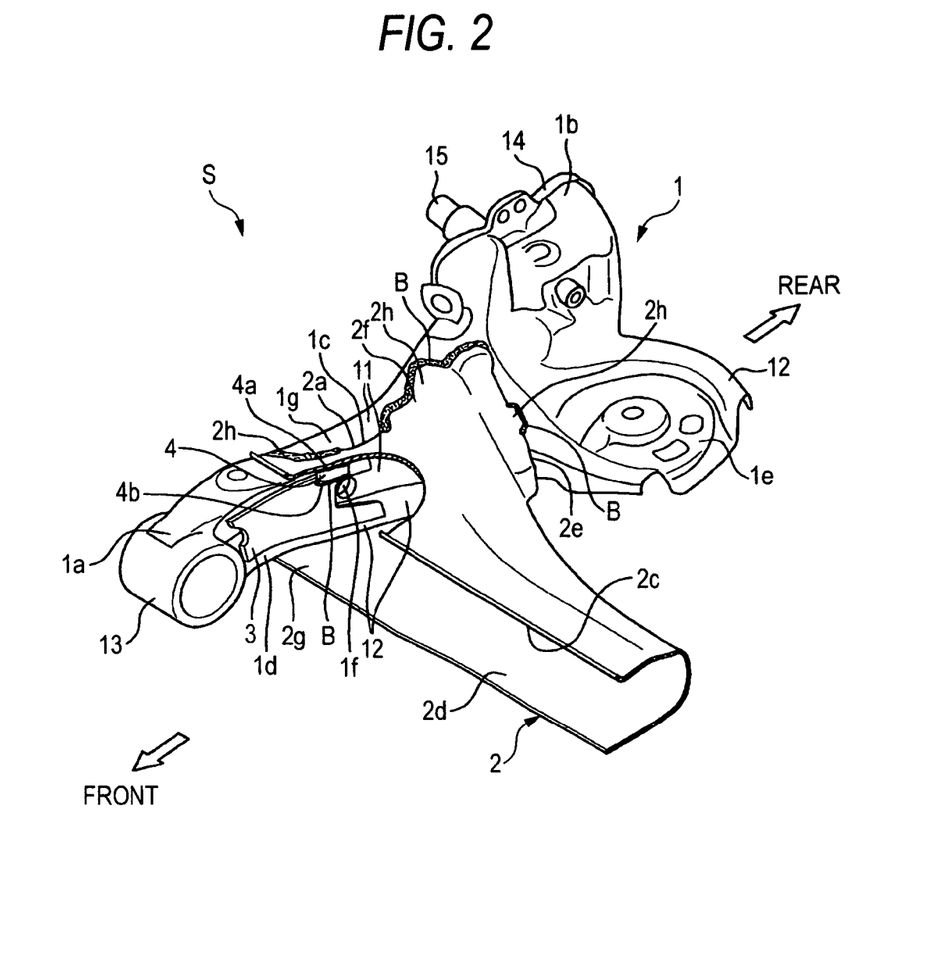
FIG. 2 is a partly cross-sectionally enlarged perspective view showing a primary portion of the torsion beam suspension according to the embodiment of the invention.
Figure 3:
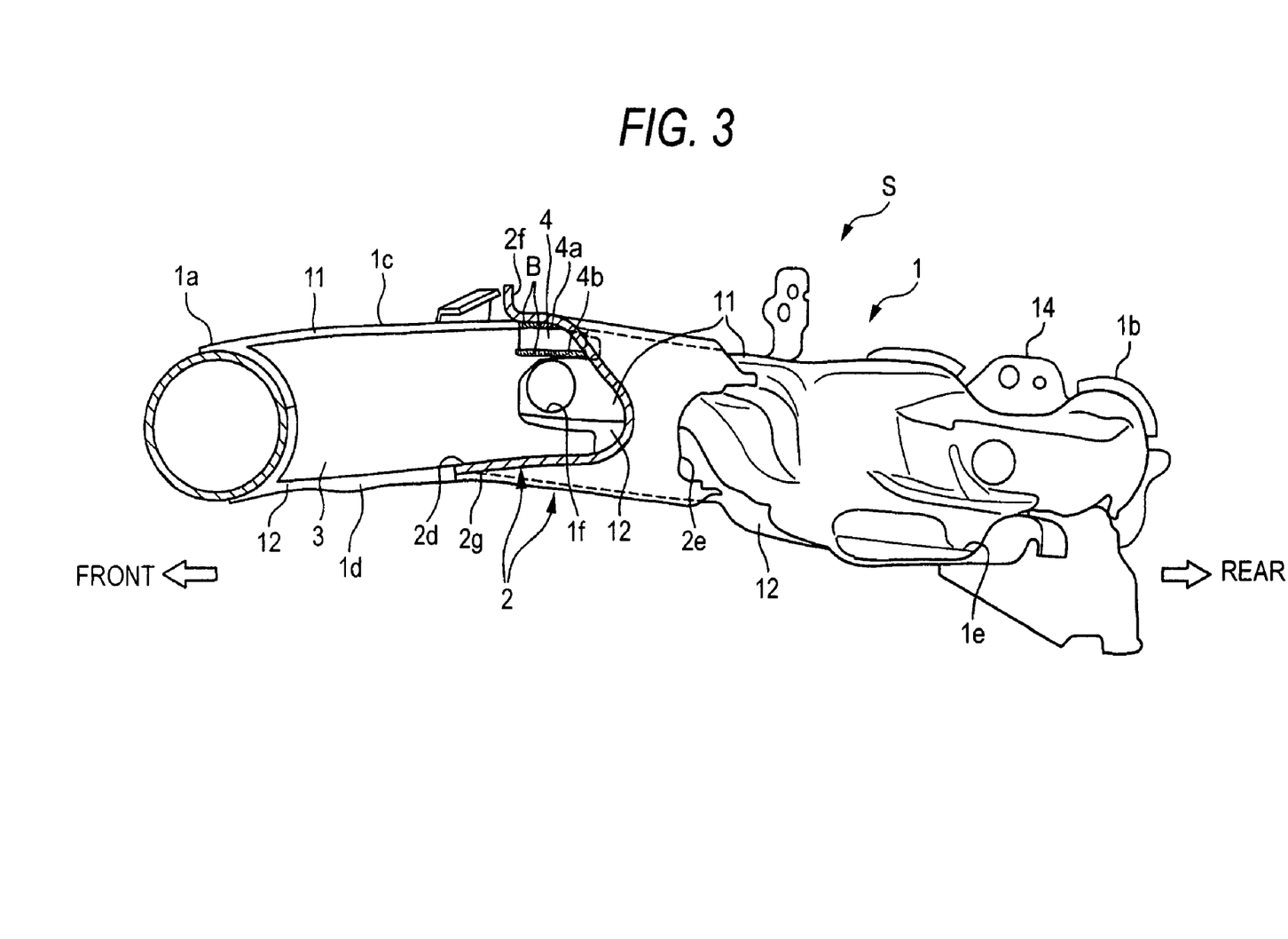
FIG. 3 is an enlarged cross-sectional view taken on line III-III shown in FIG. 1.
Figure 4:
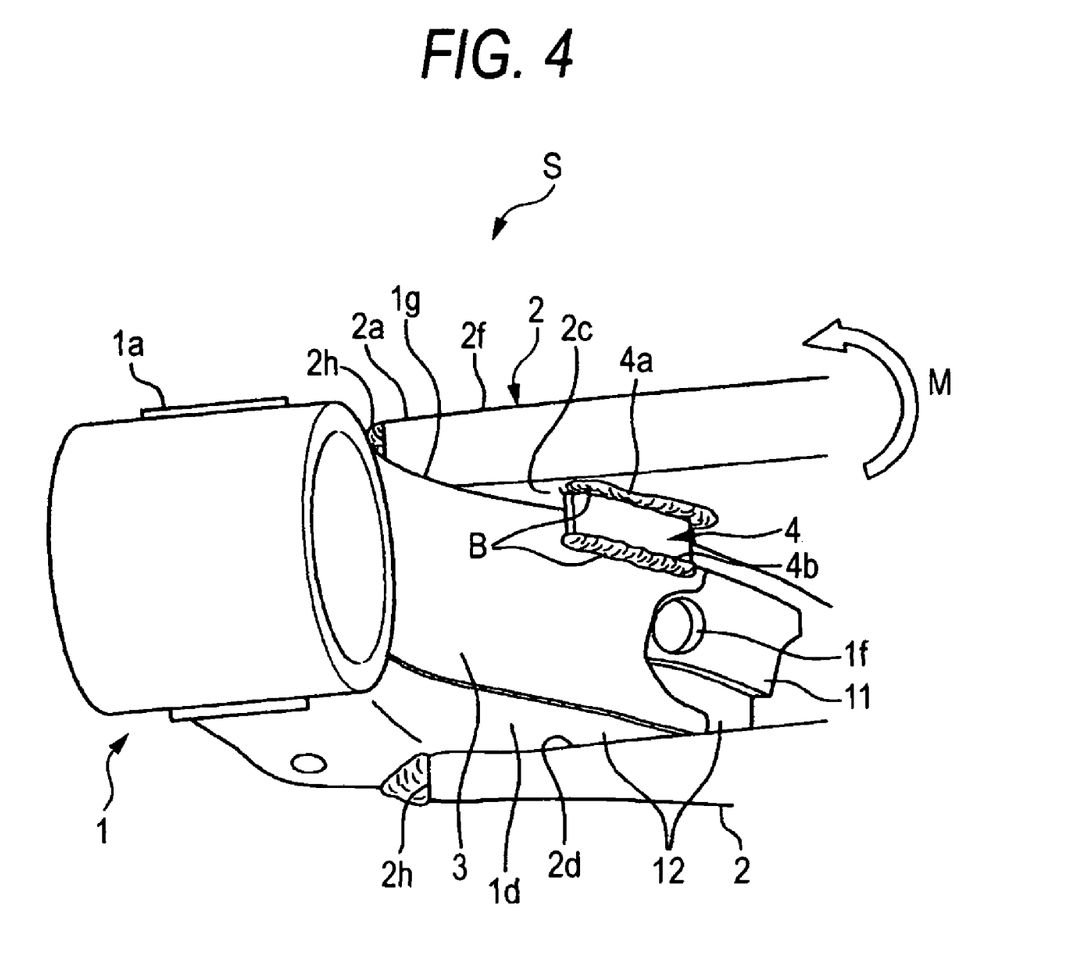
FIG. 4 is an enlarged perspective view showing a primary portion of the torsion beam suspension according to the embodiment of the invention.
Figure 5:
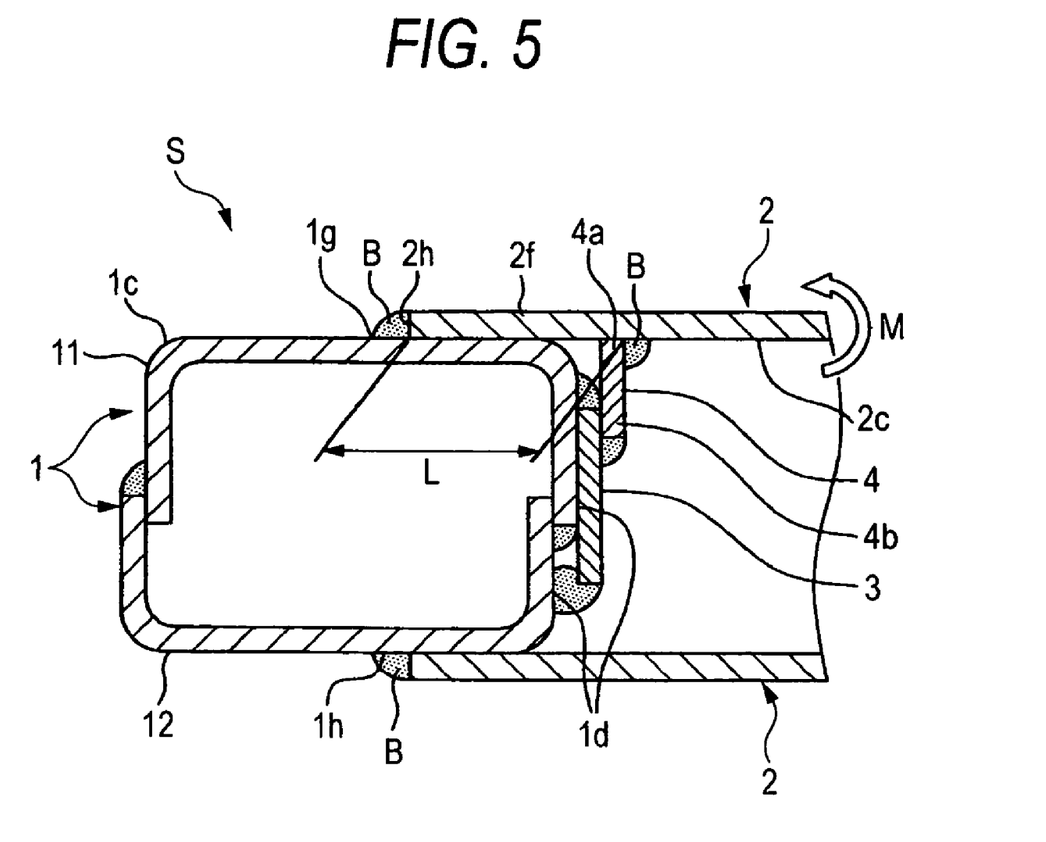
FIG. 5 is an enlarged cross-sectional view showing a primary portion of the torsion beam suspension according to the embodiment of the invention.

FIG. 1 is a perspective view showing the torsion beam suspension according to the present embodiment of the invention. FIG. 2 is a partly cross-sectionally enlarged perspective view showing a primary portion of the torsion beam suspension according to the embodiment of the invention. FIG. 3 is an enlarged cross-sectional view taken on line III-III shown in FIG. 1. FIG. 4 is an enlarged perspective view showing a primary portion of the torsion beam suspension according to the embodiment of the invention. FIG. 5 is an enlarged cross-sectional view showing a primary portion of the torsion beam suspension according to the embodiment of the invention.

Configuration of Torsion Beam Suspension

As shown in FIG. 1, the torsion beam suspension S is a suspension connecting a vehicle body (not shown) to each of rear wheels W, W of an automobile, and is formed to be bilaterally symmetrical. The torsion beam suspension S includes a pair of lateral trailing members 1, each of which has a front end portion 1a pivotally supported by the vehicle body and also has a rear end portion 1b adapted to suspend rear wheels (traveling wheels) W, and also includes a torsion beam 2 adapted to have an open face, in which a vehicle front side thereof is opened, and to extend in a lateral direction of the vehicle. Intermediate portions 1c, 1c of the pair of trailing members 1 are respectively bonded to both end portions 2a, 2a of the torsion beam 2. Incidentally, in the torsion beam suspension S, on an inner side wall 1d of each of the trailing members 1, a patch member connecting a corresponding one of the trailing members 1 to the torsion beam 2 is disposed.

Configuration of Trailing Member

As shown in FIG. 1, the trailing members 1 are what are called trailing arms adapted to support the left and right rear wheels W and the left and right end portions of the torsion beam 2. Each of the intermediate portions 1c of the trailing members 1 is formed into a hollow shape by welding a cross-sectionally U-shaped upper frame 11 to a cross-sectionally U-shaped lower frame 12 (see FIG. 5). That is, a closed quadrilateral-shaped cross-section is formed by the cross-sectionally U-shaped upper frame 11 and the cross-sectionally U-shaped lower frame 12 to thereby reinforce each of the intermediate portions 1c (see FIG. 5).

A flat joint portion 1g, to which an upper inside wall portion 2c of the torsion beam 2 (to be described later) is welded, is formed on the top surface of the upper frame 11 of each of the intermediate portions 1c. A flat joint portion 1h, to which a lower inside wall portion 2d of the torsion beam 2 is welded, is formed on the bottom surface of the lower frame 11 of each of the intermediate portions 1c (see FIGS. 4 and 5). Also, a through hole 1f is bored in each of the intermediate portions 1c to extend in a lateral direction. The trailing arm comprises a flat-plate-like reinforcement member 3 is provided on an inner side wall 1d between the through hole 1f and the trailing arm support portion 13 of each of the intermediate portions 1c. Additionally, a patch member 4 is disposed on each of the reinforcement members 3.

As shown in more detail in FIG. 2, the cylindrical trailing arm support portion 13 is welded to the front end portion 1a of each of the trailing members 1. The torsion beam suspension S is pivotally supported on the vehicle body through a rubber bush joint (not shown) accommodated in the trailing arm support portion 13 to be able to swing upwardly and downwardly.

A spindle support plate 14, to which a spindle 15 is fixed, is welded to the outer surface of the rear end portion 1b of each of the trailing members 1. The left and right rear wheels W are rotatably and axially supported on the spindle 15. A spring seat 1e supporting the bottom of a damper suspension spring (not shown) is formed inside the rear end portion 1b of each of the trailing members 1.

The upper frame 11 includes a metallic plate member used to form the entire top surface portion of a corresponding one of the trailing members 1. The flat joint portion 1g and the spring seat 1e are formed by press-working.

The lower frame 12 includes a metallic plate member used to form the entire lower part of the corresponding one of the trailing members 1. A closed quadrilateral-shaped cross-section of each of the trailing members 1 is formed by bonding the lower frame 12 to the bottom portion of the upper frame 11 (see FIG. 5). Consequently, the strength of the torsion beam suspension S is enhanced.

Configuration of Torsion Beam

As shown in FIG. 2, the torsion beam 2 is formed by being cross-sectionally substantially-U-shaped and being opened to the front side of the vehicle. The torsion beam 2 is provided to hang between the pair of the left and right trailing members 1. The torsion beam 2 is formed by using, for example, a metal plate material, such as a spring-steel, which has torsibility in a torsional direction. The entire torsion beam 2 is formed in a substantially U-shape in side view. The front end portion of an upper piece portion 2f is formed by being upwardly bent at a right angle (see FIG. 3) to thereby reinforce the torsion beam 2.

A cutout portion 2e having a substantial-U-shape in rear view is formed in a rear end of each of both the lateral end portions 2a, 2b (see FIG. 1) of the torsion beam 2. Each of the trailing members 1 is inserted into and is fixed to the cutout portion 2e. Each of both the end portions 2a and 2b of the torsion beam 2 (see FIG. 1) is formed by forming the cutout portion 2e to be bifurcated in an up-down direction into the upper piece portion 2f, which is placed at an upper side, and a lower piece portion 2g placed at a lower side.

As shown in FIG. 2, the upper piece portion 2f is placed on the top surface of the intermediate portion 1c of the trailing member 1 and is welded to the joint portion 1g.

The lower piece portion 2g is placed on the bottom surface of the intermediate portion 1c of the trailing member 1 and is welded to the joint portion 1h.

As shown in FIG. 2, each of the cutout portion 2e, the left and right end parts of the upper piece portion 2f, and the left and right end parts (not shown) of the lower piece portion 2g of the torsion beam 2 has a welded portion 2h formed into a predetermined shape to reduce a stress applied to a weld bead B provided at a place at which the torsion beam 2 and the trailing member 1 is bonded to each other. The welded portion 2h is formed to protrude like, for example, a curve and is fixed to the trailing member 1 by arc-welding a peripheral part of the welded portion 2h thereto.

As shown in FIG. 3, the reinforcement member 3 is a metal plate member adapted to reinforce the joint part between the upper frame 11 and the lower frame 12. The reinforcement member 3 is welded to the joint part therebetween, which is disposed on the inner side wall 1d of the trailing member 1, to cover the joint part.

Incidentally, it is sufficient to place the reinforcement member 3 thereon as need arises. That is, the reinforcement member 3 may be omitted.

Configuration of Patch Member

As shown in FIG. 4, the patch member 4 is a peeling-off prevention bracket adapted to connect the upper inside wall portion 2c of the cross-sectionally substantially-U-shaped torsion beam 2 to the reinforcement member 3 disposed on the inner side wall 1d of the trailing member 1 by welding. The patch member 4 is constituted by a relatively small quadrangular metal plate member. An upper edge portion 4a is welded to the upper inside wall portion 2c. A lower edge portion 4b is welded to the reinforcement member 3 (the inner side wall 1d). Thus, the torsion beam 2 and the trailing member 1 are connected to each other to prevent the torsion beam 2 from being separated from the trailing member 1 (see FIG. 5).

Procedure for Assembling Torsion Beam Suspension

Next, a procedure for bonding the torsion beam 2 to the right trailing member 1 is described below.

First, as shown in FIG. 2, the cutout portion 2e of the torsion beam 2 is engaged with the intermediate portion 1c of the trailing member 1. The welded portion 2h formed on each of the upper piece portion 2f and the cutout portion 2e is welded to the joint portion 1g provided on the upper frame 11. Each of the lower piece portion 2g and a projection piece (not shown) from the cutout portion 2e are welded to the joint portion 1h provided on the lower frame 12.

Subsequently, the joint portion between the upper frame 11 and the lower frame 12 placed on the inner inside wall 1d of the trailing member 1 is covered with the reinforcement member 3 that is then welded to the inner side wall 1d of the trailing member.

Additionally, the patch member 4 is disposed to be put over the reinforcement member 3. The upper edge portion 4a of the patch member 4 is welded to the upper inside wall portion 2c of the torsion beam 2. The lower edge portion 4b is welded and connected to the lower inside wall portion 2d of the torsion beam 2. Thus, the torsion beam suspension is reinforced.

Incidentally, the left side part of the torsion beam 2 is welded to the trailing member 1, similarly to the aforementioned manner. Thus, the torsion beam 2 is attached to the left and right trailing members 1.

Operation of Torsion Beam Suspension

Next, an operation of the torsion beam suspension according to the embodiment of the invention is described below with reference to FIGS. 1 to 5.

In the torsion beam suspension S assembled as described above, the trailing members 1 supporting the left and right rear wheels W bound downwardly and upwardly, as indicated by arrows C and D, with different amplitudes, respectively, due to unevenness of the surface of a road, on which the automobile runs, or to a lateral force caused during the turning of an automobile.

Then, an upward bending moment M shown in FIG. 5 is applied to the joint portion between the torsion beam 2 and each of the trailing members 1. Thus, a stress is applied thereto in a peeling direction in which the welded portion 2h of the upper piece portion 2f of the torsion beam 2 welded to the joint portion 1g of each of the trailing members 1 is peeled off.

On the other hand, the welded portion 2h provided on the outer surface of the upper piece portion 2f of the torsion beam 2 is welded to the joint portion 1g provided on the top surface of each of the trailing members 1. Additionally, the upper inside wall portion 2c placed toward the center of the torsion beam 2 (see FIG. 1) from the welded portion 2h is welded to the upper edge portion 4a of each of the patch members 4, which is welded to the inner side wall 1d of a corresponding one of the trailing members 1.

Thus, the upper inside wall portion 2c of the torsion beam 2 is bonded to the upper edge portion 4a of the patch member 4 disposed on the inner side wall 1d of each of the trailing members 1. Consequently, a part, to which a maximum stress is applied when the bending moment M is applied to the torsion beam 2, is the upper edge portion 4a that is the joint portion between the torsion beam 2 and each of the patch members 4.

The upper edge portion 4a is shifted from the welded portion 2h provided on the torsion beam 2 to the center O (see FIG. 1) of the torsion beam 2 by a length L, as shown in FIG. 5.

Additionally, as shown in FIG. 4, the patch member 4 is placed to be directed in a direction perpendicular to the direction of the bending moment M of the torsion beam 2. Also, the patch member 4 is shaped like a rectangle whose long side extends in the direction perpendicular to the direction of the bending moment M. The upper edge portion 4a to be welded to the upper inside wall portion 2c of the torsion beam 2 has a low stress concentration factor.

Consequently, the patch members 4 can prevent the torsion beam 2 from being peeled from the trailing member 1 due to the bending moment M. Also, the durability of the torsion beam suspension can be enhanced.

Incidentally, the invention is not limited to the above embodiment. Various modifications and alterations can be made within the scope of the technical idea thereof. Needless to say, the invention covers the various modifications and alterations.

Modifications

Figure 6:
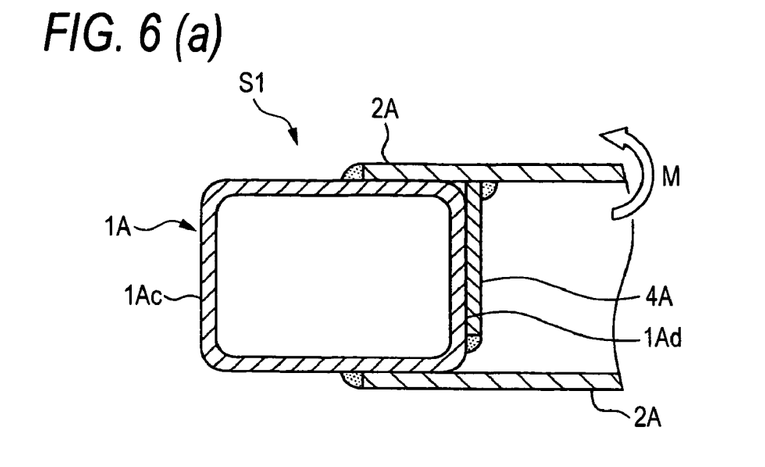
FIG. 6A is an enlarged cross-sectional view showing a primary portion of the modification in a case where a patch member is directly bonded to a trailing member.
FIG. 6B is an enlarged cross-sectional view showing a primary portion of the modification in a case where the patch member is cross-sectionally L-shaped.
FIG. 6C is an enlarged cross-sectional view showing a primary portion of the modification in a case where the patch member is bonded to the trailing member in which an upper frame and a lower frame are engaged with each other.

FIGS. 6A to 6C are views showing modifications of the torsion beam suspension according to the embodiment of the invention. FIG. 6A is an enlarged cross-sectional view showing a primary portion of the modification in a case where a patch member is directly bonded to a trailing member. FIG. 6B is an enlarged cross-sectional view showing a primary portion of the modification in a case where the patch member is cross-sectionally L-shaped. FIG. 6C is an enlarged cross-sectional view showing a primary portion of the modification in a case where the patch member is bonded to the trailing member in which an upper frame and a lower frame are engaged with each other.

Similarly to the torsion beam suspension S shown in FIG. 6A, the intermediate portion 1Ac of the trailing member 1 may be formed using a cross-sectionally quadrilateral-shaped tube-like member. Thus, a closed cross-section is formed by a single member in the intermediate portion 1Ac of the trailing member 1A. Consequently, the stiffness of the torsion beam suspension can be further enhanced.

Also, the patch member 4A shown in FIG. 6A may be formed so that the length in an up-down direction thereof is directly be set to be slightly shorter than the length in the up-down direction of the inner side wall 1Ad of the trailing member 1A, and that the patch member 4A is bonded to substantially the entire inner-side-wall 1A in side view.

Thus, the patch member 4A is configured so that the length in the up-down direction thereof is long. Consequently, the stiffness of the torsion beam 2A against the bending moment M can be further enhanced.

Also, the patch member 4A is not limited to the flat-plate-like member. For example, an L-shaped patch member 4N and a square bar (not shown) formed into a right-angled triangle in side view may be used.

Thus, the patch member 4B is configured so that the upper edge portion 4Ba bonded to the upper inside wall portion 2Bc of the torsion beam 2B is shifted from the inner side wall 1Bd of the trailing member 1B to the center O (see FIG. 1) of a torsion beam suspension S2 by a length L1. Consequently, a maximum stress is applied to the upper edge portion 4Ba of the patch member 4B. Thus, regarding the stress due to the bending moment M, the stress applied to a welded portion 2Bh is reduced. Accordingly, the durability of the torsion beam suspension is enhanced.

Incidentally, as illustrated in FIG. 6C, the intermediate portion 1Cc of the trailing member 1C may be formed by bonding a cross-sectionally U-shaped upper frame 11C to a cross-sectionally U-shaped lower frame 12C, which is symmetrical to and is engaged with the frame 11C.

Alternatively, the trailing member 1C may be a cross-sectionally circular-shaped cylindrical tube or a cross-sectionally U-shaped square-bar.

That is, the shape of the trailing member 1C of the torsion beam suspension S3 may appropriately be changed, on the condition that a joint portion 1Cg to be welded to an upper inside wall portion 2Cc of a torsion beam 2C is provided on the top surface of the trailing member 1C of the torsion beam suspension S3, that a joint portion 1Ch to be welded to a lower inside wall portion 2Cd of the torsion beam 2C is provided on the bottom surface of the trailing member 1C, and that an inner side wall 1Cd has a part to which a patch member 4C is fixed.

Although the cross-sectionally substantially-U-shaped torsion beam 2 opened at the vehicle front side thereof has been described in the foregoing description of the above embodiment by way of example, the torsion beam ma y be opened at the opposite side, that is, the vehicle rear side thereof.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within true spirit and scope of the present invention.

What is claimed is:

1. A torsion beam suspension comprising:
    a trailing member which comprises:
        a front end portion pivotally supported by a vehicle body; and
        a rear end portion suspending a wheel;
    a torsion beam that extends in a lateral direction of a vehicle, and comprises:
        an open face opposing to a vehicle front side or a vehicle rear side;
        an end portion connected to an intermediate portion of the trailing member; and
    a plate shaped patch member having opposing inner and outer broad face portions and a plurality of narrow edge face portions, including at least upper and lower narrow edge face portions, surrounding the broad face portions, wherein:
    the inner broad face portion abuts an inner side wall of the trailing member, the upper narrow edge face portion of the patch member is welded at an upper inside wall portion of the torsion beam, and the lower narrow edge face portion of the patch member is welded at an inner side wall portion of the trailing member, and is separated from a lower inside wall portion of the torsion beam.

2. The torsion beam suspension according to claim 1, wherein
    the torsion beam is substantially U-shaped in cross section, the torsion beam is opened to the vehicle front side or the rear vehicle side, the inner broad face portion of the patch member face-contacts with the inside wall of the trailing arm, and the upper narrow edge face portion face-contacts with the upper inside wall portion of the torsion beam.

3. The torsion beam suspension, as set forth in claim 1, wherein
    the torsion beam has a flange portion at an upper opening end thereof,
    the patch member is connected to the upper inner wall of the torsion beam having the flange portion.

4. The torsion beam suspension according to claim 1, wherein the trailing member further comprises a substantially plate shaped reinforcement member which comprises an inner broad face portion and an outer broad faceportion which is opposed to the inner broad face portion, and a plurality of narrow edge face portions which surround the broad face portions and include at least upper and lower narrow edge face portions,
    the inner broad face portion of the reinforcement member abuts the inner side wall of the trailing member,
    the outer broad face portion of the reinforcement member is welded at the lower narrow edge portion of the patch member, and
    the lower narrow edge face portion of the reinforcement member is welded at the inside wall of the trailing arm.

5. The torsion beam suspension according to claim 1, wherein the patch is substantially L-shaped in cross section.

6. The torsion beam suspension according to claim 1, wherein the patch member extends longitudinally in the direction of the vehicle and transverse to the orientation of the torsion beam.

7. An assembling method for a torsion beam suspension comprising:
    engaging a cutout portion of a torsion beam with an intermediate portion of a trailing member;
    welding an end portion of the torsion beam to the intermediate portion of the trailing member;
    welding a reinforcing member to the inner side wall of the trailing member so as to cover a welded portion at which the trailing member is welded to the torsion beam;
    welding an upper edge portion of a plate shaped patch member to an upper inside wall portion of the torsion beam, and
    welding a lower edge portion of the patch member to a face of the reinforcing member, wherein a face portion of the patch member disposed between the upper and lower edge portions abuts the face of the reinforcing member.

8. The assembling method for the torsion beam suspension, as set forth in claim 7, wherein the torsion beam extends in a lateral direction of a vehicle, and the torsion beam comprises an open face extending in the lateral direction of the vehicle and facing toward a vehicle front side or a vehicle rear side.

9. A torsion beam suspension for connecting a vehicle body of a vehicle to each of two rear wheels of the vehicle, said torsion beam suspension comprising:

a torsion beam extending in a lateral direction of the vehicle, first and second trailing members extending substantially horizontally in the longitudinal direction of the vehicle and respectively attached to opposite end portions of said torsion beam, and a respective patch member for each of said trailing members, wherein said patch member reinforces the connection between a corresponding trailing member and said torsion beam along a longitudinally extending seam therebetween;

wherein each of said trailing members comprises:

a front end portion configured to be pivotally supported by the vehicle body;

an intermediate portion having a substantially rectangular cross-sectional shape and including an upper surface, a lower surface, an outer side wall and a substantially vertical inner side wall; and a rear end portion configured and arranged for suspending an associated one of said rear wheels thereon;

wherein said torsion beam extends in the lateral direction of the vehicle, and comprises:

an open face extending in the lateral direction of the vehicle and facing toward a vehicle front side or a vehicle rear side; and an end portion connected to the intermediate portion of the trailing member, said end portion including an upper section which is affixed to the upper surface of the trailing member, and a lower section which is affixed to the lower surface of the trailing member;

and wherein each of said patch members comprises a substantially vertical plate portion having opposing inner and outer broad face portions and a plurality of narrow edge face portions, including at least upper and lower narrow edge face portions, surrounding the broad face portions, and wherein the inner broad face portion abuts the inner side wall of the trailing member and the upper narrow edge face portion abuts the upper section of the torsion beam, and wherein welds adjacent the upper narrow edge face portion and the lower narrow edge face portion respectively affix the patch members to the upper section of the torsion beam and the inner side wall of the trailing member.

10. The torsion beam suspension according to claim 9, wherein the patch member extends longitudinally in the direction of the vehicle and transverse to the orientation of the torsion beam.

\* \* \* \* \*